United States Patent Office 3,743,610
Patented July 3, 1973

3,743,610
SPRAY DRIED DETERGENT COMPOSITION OF CONTROLLED ALKALINITY
Helmut H. Weldes, Havertown, Pa., assignor to Philadelphia Quartz Company, Philadelphia, Pa.
No Drawing. Filed July 20, 1971, Ser. No. 164,425
Int. Cl. C11d 11/02, 3/26, 3/08
U.S. Cl. 252—527      1 Claim

ABSTRACT OF THE DISCLOSURE

Fragments of alkali metal silicate glass are included in spray dried detergent formulations with acidic organic sequestering agents to control the pH of the system during preparation and use.

INTRODUCTION

Spray dried detergents are prepared by combining the detergent components in a slurry of about 60% in a mixer called a crutcher followed by spray drying of the slurry to obtain a granular, free-flowing product of about 10% water content. A home laundry detergent typically includes 5 to 40% surfactant or combination of surfactants; 10 to 50% sequestering agent such as sodium tripolyphosphate; 5 to 15% sodium silicate; 0 to 5% anti-redeposition agent, such as sodium carboxymethylcellulose (NaCMC); 0 to 25% sodium sulfate and 0 to 2% optical brightener. Other ingredients such as perfumes, enzymes, dyes, etc. may be blended after spray drying.

It has been found that the phosphates added to detergents as builders and sequestering agents may be injurious to the environment and should be eliminated. A method has been found by which phosphates can be replaced in spray dried detergent formulations. Fragments of alkali metal silicate glasses are added to detergent slurries in the crutcher where they readily hydrate and dissolve. However, relatively large amounts of these alkaline materials produce washing solutions of high pH and while the silicate supplies the builder properties of the phospsate, it does not effectively sequester metal ions such as $Ca^{++}$ and $Mg^{++}$. The pH of the washing solution can be controlled and the sequestering power needed can be supplied by adding acidic organic sequestering agents to the detergent slurry in the crutcher after the glass particles have dissolved. The slurry is then spray dried to free-flowing granules of 10% water content.

THE INVENTION

The alkali metal silicate glass can be produced by any method such as fusion of an alkali metal carbonate with a source of silica; the $SiO_2/M_2O$ mole ratio of the glass can be between 1.5/1.0 and 4.0/1.0, where M stands for an alkali metal or a combination of alkali metals. The particle size of the glass is important; it should be less than 100 mesh and can be less than 200 mesh with advantage. Silicate glass that has been ground in ball mills and the like is useful for this invention but other methods of sub-dividing glass also produce useful particles. Such methods include thermal stressing of thin glass films as described in copending patent application Ser. No. 153,806, chopping fine fibers of silicate glass and atomization of molten glass to form beads as described in co-pending patent application Ser. No. 129,107.

Commonly, sodium silicate glasses are used in this invention but potassium silicate glasses can be used. It has also been found that sodium-potassium double silicate glasses are also useful.

The sequestering agents used in this invention can be any chemical or combination of chemicals capable of reducing the activity of metal ions in solution and maintaining the ions in solution, and have an acid function. The most important of such metal ions are $Ca^{++}$ and $Mg^{++}$ which decrease the efficiency of surfactants, and in general are responsible for the reactions of hard water. Many chemicals reduce the activity of these ions in solution but do not maintain them in solution while the agents employed in this invention achieve both functions. Such agents include, among others, the following organic acids: nitrilotriacetic acid (NTA), ethylenediaminetetraacetic acid (EDTA), diethylenetriaminepentaacetic acid (DPTA), and citric acid (CA). Hydroxy acids and polyhydroxy acids such as gluconic acid, glucoheptonic acid and oxydiacetic acid.

The detergent formulations of this invention can be prepared in the following manner. The surfactant, for example, a paste containing 28% linear alkyl benzene sulfonate, 22% $Na_2SO_4$ and 50% $H_2O$ can be prepared by sulfonating the alkylate group and neutralizing the acid with caustic. This surfactant paste, 20 to 80 p.b.w., was placed in the crutcher, then the silicate glass particles, 20 to 60 p.b.w., were added with sufficient water at 65 to 95° C. to dissolve the glass and provide a final slurry concentration at 60 to 70% solids. Then 0 to 5 p.b.w. of anti-redeposition agent such as NaCMC and 0 to 2 p.b.w. of optical brightener were blended into the crutcher. After the glass particles hydrated and dissolved, 20 to 60 p.b.w. of acidic organic sequestering agent were added to the crutcher and blended into the slurry. The slurry was then pumped into a spray tower and dried to a free-flowing granular product containing 3 to 15% water.

Detergents prepared by this invention dissolved quickly and completely to provide normal washing solutions at concentrations of about 0.15% with pH values at about 9.15 to 10.2. If similar amounts of the low silica to alkali glass particles are formulated with no acidic sequestering agents but with sodium or potassium salts of the acids, the pH values are high with the attendant harshness to hands and fabrics.

EXAMPLES

A better understanding of the invention can be obtained from the following examples that illustrate certain embodiments of the invention but should not be considered restrictive. The $SiO_2/M_2O$ ratios are on a mole basis and the mesh sizes refer to Tyler series screens.

Example 1

A spray dried detergent was prepared using sodium silicate glass fragments with a ratio of 2.5/1.0 ($SiO_2/Na_2O$). The particle size was less than 100 mesh and the size reduction was achieved by chopping fine fibers. The detergent was produced as follows. A slurry of the following composition was prepared in a crutcher.

|  | P.b.w. |
|---|---|
| Surfactant paste (28% linear dodecylbenzene sulfonate, 22% $Na_2SO_4$ and 50%, $H_2O$) | 62.0 |
| Sodium silicate glass fiber fragments ($SiO_2/Na_2O$=2.5/1.0, less than 100 mesh) | 30.0 |
| NaCMC | 1.5 |
| Blancophor RG (optical brightener, GAF Corp.) | 0.3 |
| Water | 10.0 |

This slurry was blended in the crutcher for 5 minutes at 85° C. during which time the glass fiber fragments dissolved; then 27 p.b.w. of nitrilotriacetic acid was added. The resulting slurry after some further blending, was pumped to a spray tower with full counter-current air flow and jet type spray. The inlet temperature was 320° C. and the outlet temperature was 93° C. The production rate was 5,000 p.b.w./hour of a free-flowing granular product with a bulk density of 0.35 g./cc. and a moisture content of 10.1%. The product dissolved readily in home washing machines and an 0.15% solution (normal washing concentration) had a pH of 9.5 and was not harsh to hands or fabrics.

Example 2

A spray dried detergent was made according to the process of Example 1 except that sodium nitrilotriacetic acid was used instead of NTA. The product was a free-flowing granular material with a bulk density of 0.35 g./cc. and a moisture content of 10.3%. The product dissolved readily in home washing machines but an 0.15% solution had a pH above 10.5 and it was harsh to hands and fabrics.

Example 3

A spray dried detergent was prepared using sodium silicate glass fragments with a ratio of 1.8/1.0 ($SiO_2/Na_2O$). The particle size was less than 200 mesh and the size reduction was achieved by ball milling. The detergent was prepared as follows. A slurry of the following composition was prepared in a crutcher.

|  | P.b.w. |
|---|---|
| Surfactant paste of Example 1 | 62.0 |
| Sodium silicate glass powder | 30.0 |
| NaCMC | 1.5 |
| Blancophor RG | 0.3 |
| Water | 10.0 |

This material was blended for 5 minutes at 85° C. during which time the glass hydrated and dissolved, then 30 p.b.w. of citric acid was added and dissolved in a few minutes. The slurry was pumped into the spray tower of Example 1. The production rate was 4,950 p.b.w./hour of a free-flowing granular product with a bulk density of 0.36 g./cc. and a moisture content of 10.1%. The product dissolved rapidly in household washing machines and an 0.15% solution had a pH of 9.4. The product was an effective laundry compound that was not harsh to hands or fabrics.

Example 4

A spray dried detergent was made according to the process of Example 3 except that oxydiacetic acid was used instead of citric acid. The product was a free-flowing granular material with a bulk density of 0.36 g./cc. and a moisture content of 10.0%. The product dissolved rapidly in household washing machines and an 0.15% solution had a pH of 9.2. The product was an effective laundry compound that was not harsh to hands or fabrics.

More or less a detailed claim will be presented hereinafter and even though such claim is rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claim. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claim.

What I claim is:

1. A method of preparing a spray dried detergent composition having at a concentration of 0.15% in water, a pH of 9.15 to 10.2 which comprises
    (1) introducing 20 to 80 p.b.w. of a surfactant into a crutcher,
    (2) adding 20 to 60 p.b.w. of alkali metal silicate glass particles having an $SiO_2/M_2O$ mole ratio of 1.5 to 4.0/1.0 and being less than 100 mesh in size,
    (3) adding sufficient water to dissolve said glass particles and provide a slurry having 60 to 70% solids,
    (4) introducing into said slurry 0 to 5 p.b.w. of an antiredeposition agent,
    (5) introducing into said slurry 0 to 2 p.b.w. of an optical brightener, and
    (6) blending to uniformity the components introduced in steps (1) through (5),
    (7) blending 20 to 60 p.b.w. of an acidic organic sequestering agent into said slurry, said agent selected from the group consisting of nitrilotriacetic acid (NTA), ethylenediaminetetraacetic acid (EDTA), diethylenetriaminetetraacetic acid (DPTA), citric acid (CA), gluconic acid, glucoheptonic acid and oxydiacetic acid, and
    (8) spray drying said slurry to obtain a granular, free-flowing product containing 3 to 15% water.

References Cited
UNITED STATES PATENTS

| | | | |
|---|---|---|---|
| 3,257,325 | 6/1966 | Koster | 252—135 |
| 3,654,168 | 4/1972 | Gaiser | 252—546 |

LEON D. ROSDOL, Primary Examiner

E. L. ROLLINS, Assistant Examiner

U.S. Cl. X.R.

252—110, 135, 537, 539